May 17, 1960
A. E. JUNGE
2,936,555
MANUFACTURE OF PLATE GLASS
Filed Nov. 12, 1958
4 Sheets-Sheet 1
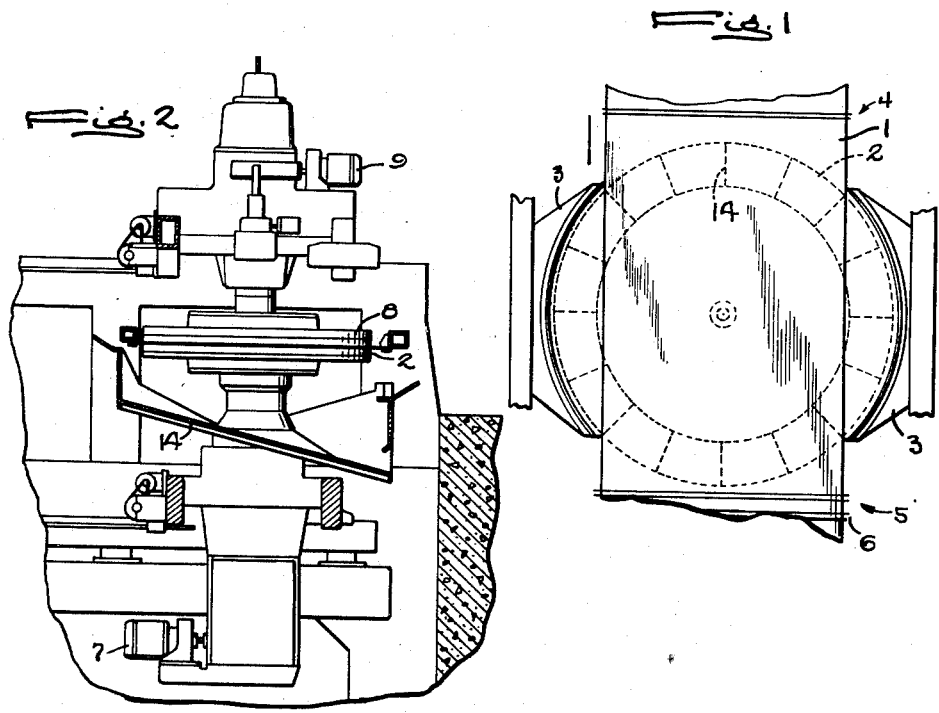
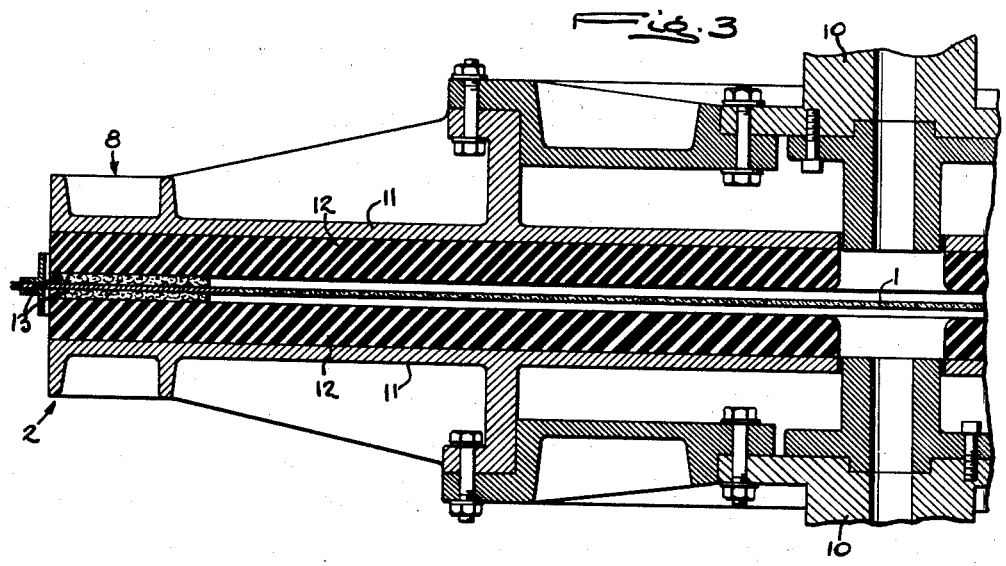
INVENTOR
Albert E. Junge
Carlson Pitzner Hubbard & Wolfe
ATTORNEY

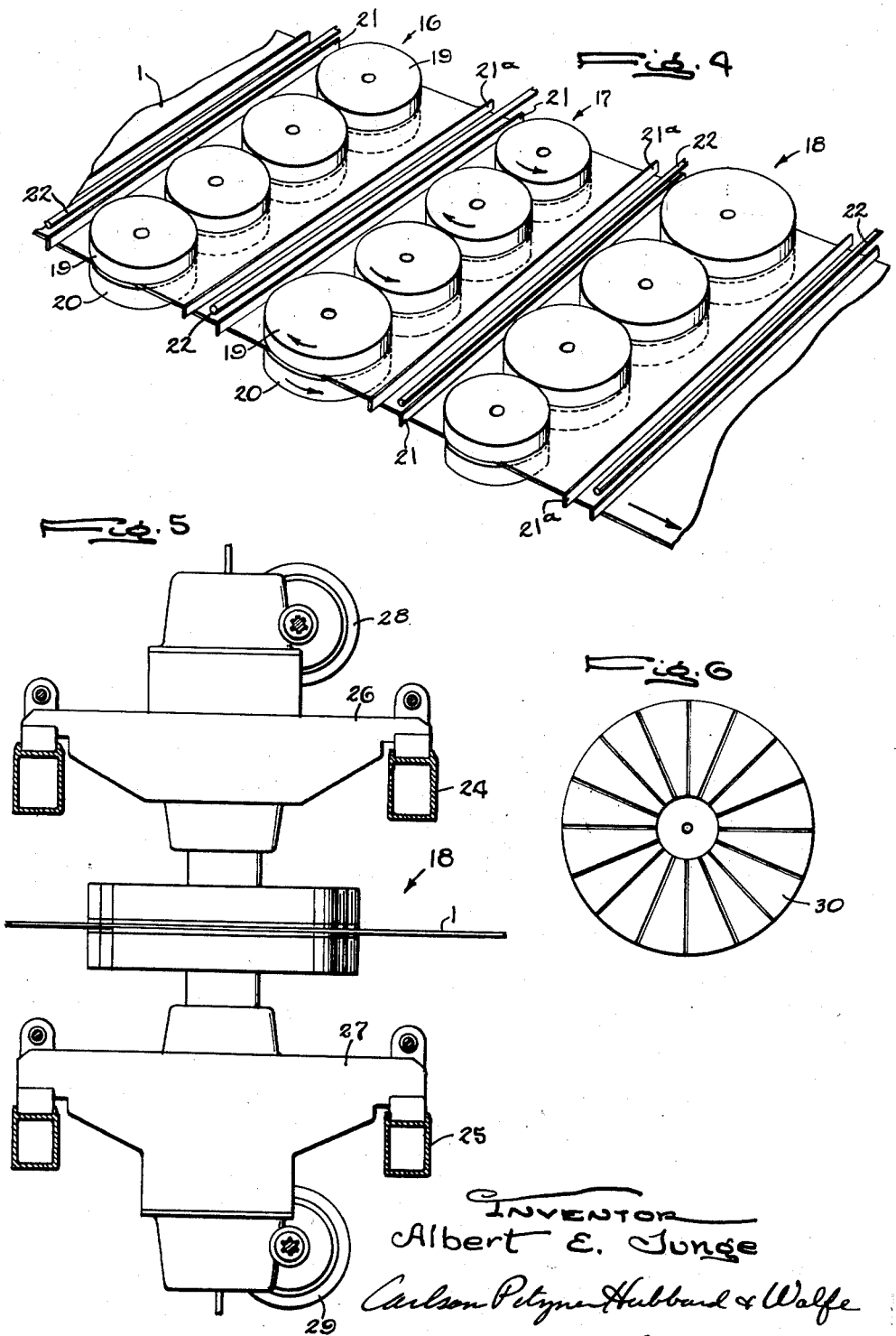

May 17, 1960   A. E. JUNGE   2,936,555
MANUFACTURE OF PLATE GLASS
Filed Nov. 12, 1958   4 Sheets-Sheet 3
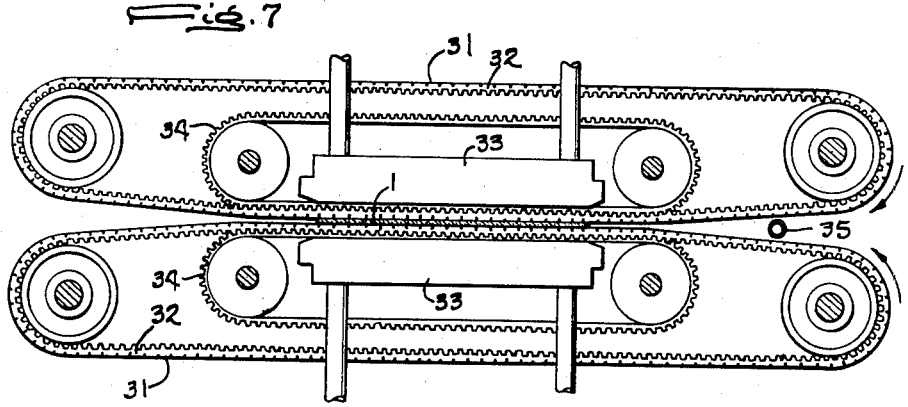
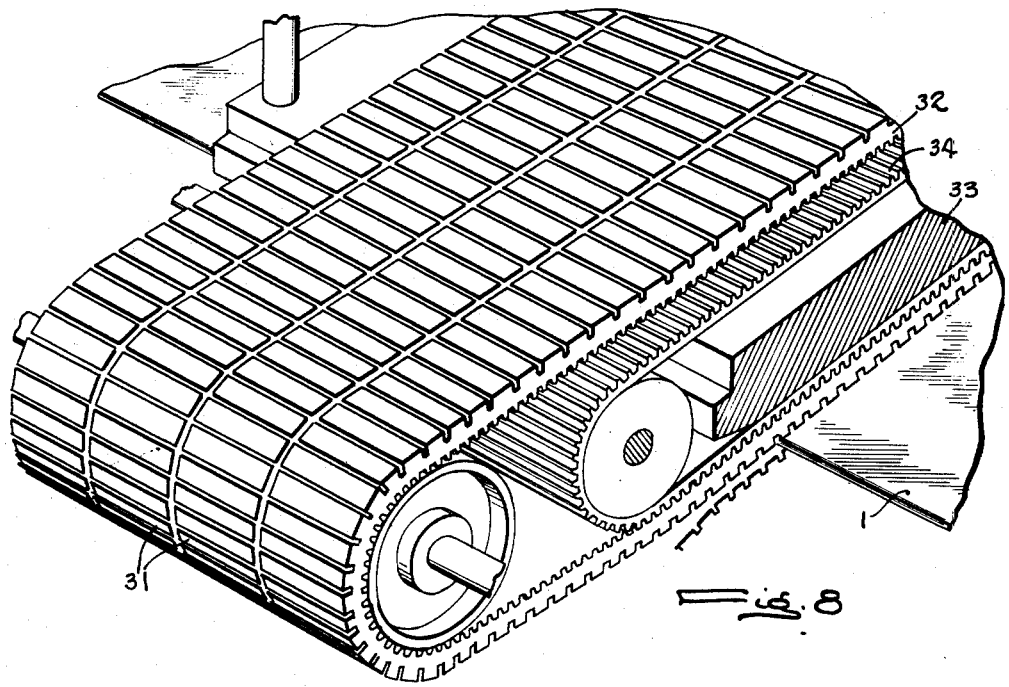
INVENTOR
Albert E. Junge
Carlson Pitzner Hubbard & Wolfe
ATTORNEY INVENTOR
Albert E. Junge

United States Patent Office 2,936,555
Patented May 17, 1960

2,936,555

MANUFACTURE OF PLATE GLASS

Albert E. Junge, New Kensington, Pa., assignor to Pittsburgh Plate Glass Company, Allegheny County, Pa., a corporation of Pennsylvania Application November 12, 1958, Serial No. 773,411

15 Claims. (Cl. 51—283)

This invention relates to the manufacture of plate glass and particularly to the polishing of ground plate glass in a moving glass line.

This application is a continuation-in-part of my copending application Serial No. 562,744, filed February 1, 1956 which is in turn a continuation-in-part of my abandoned applications Serial No. 363,341, filed June 22, 1953, and Serial No. 299,048, filed July 8, 1952, all assigned to the assignee of the present invention.

The rolling of a continuous ribbon of sand-soda-lime glass is only the beginning of the manufacture of saleable plate glass; the glass surfaces must be ground both plane and parallel and subsequently polished to make the glass completely transparent. As is well known, in economically large scale operations, many stages of conventional polishing with rouge under felt-faced runners, following the required grinding of the glass with successively finer grades of sand under cast iron runners, make for very long production lines and a very large capital outlay.

Generally stated, the aim of the present invention is to substitute for the purely mechanical rubbing techniques in the polishing of the ground plate, a new technique in which chemical attack on the glass is used to augment or speed up the operation.

The consequences are profound and far reaching. The capital outlay for the plant itself is materially reduced. The handling and working of the glass, and the associated costs and risks, are all materially reduced. Other consequences, less likely to be anticipated, are of perhaps even greater importance. These include enhanced control of quality and the realization of the glass maker's long-time dream, the running of the plate as a single, uncut ribbon from the glass tank to the finished product.

Speed without quality is not enough, and the problem of achieving quality is not simplified by the fact that only a microscopic amount of glass in terms of the plate thickness is removed by polishing. A great deal of work is required in conventional rouge polishing lines to remove the glass in the small particle sizes required and to avoid imparting further surface defects. Departures are likely to be introduced from many sources. Breakdown of a runner unit or alteration in its speed may be reflected in the quality of the product. Various types of defects, sometimes known in the industry by such deprecatory terms as "orange peel," "sweep" and "sleek," are introduced by unwanted marring actions of the polishing runners themselves. Defect-producing conditions are not readily located and controlled, because of the usually long length of line in conventional rouge polishing between the defect-producing runner or runners and a station beyond the polishing line where the glass can be washed and inspected. Isolation of a defect-producing source is likewise difficult in view of the very length of the polishing line.

The present invention makes it possible to exercise much more precise control at all stages, to isolate and correct difficulties quickly and, in general, to provide more in the manner of a science than an art.

As to handling the plate, it should be borne in mind that historically it was the practice to cut the annealed rough glass ribbon into successive sections, trim their side edges, and embed each section in wet plaster of Paris on a rail mounted car. So mounted, it passed through hundreds of feet of grinding and polishing stations to surface its upper side. Then each piece had to be turned over, relaid in plaster, and the whole thing repeated.

Progress toward reducing such formidable handling problems and size of plant has been made with what is known as "twinning." In brief, the continuous ribbon of glass emerging from the annealing lehr has been drawn along uncut between pairs of rubber pinch rolls and the grinding done by opposed pairs of runners. Proposals have been made to do the rouge polishing in glass so ground by simply continuing the ribbon and using opposed upper and lower polishing runners. With such an uncut ribbon the grinding and polishing line speeds are directly tied to the continuous output of the glass tank. So far as is known, however, no one has ever succeeded in an actual commercial installation. Rouge polishing is inherently so slow, entails the use of so many stations along a moving line, that the uncut length of glass ribbon would have to be extended to a length that no one has dared undertake.

The present invention, however, entails a sufficiently speedy and accurately controlled surfacing of the glass that the whole operation can be done on a single uncut ribbon of glass. The resulting savings in handling costs and increase in the percentage of glass eventuating as saleable product contribute to the economic advantage of the project.

To realize the broad objectives of this invention not only have new methods or techniques for polishing the glass been provided, but entirely new compositions for such use have been devised. Their formulation is later described as well as certain theoretical aspects of how they probably function.

Other objects and advantages of the invention will become apparent with the unfolding of the description in connection with the accompanying drawings in which:

Fig. 1 is a schematic plan view of a first form of polishing apparatus suitable for practice of the invention in which a large rotary ring is employed;

Fig. 2 is an end view of a twin runner assembly for the Fig. 1 apparatus;

Fig. 3 is a cross-section view of one of the runners of Fig. 2, particularly illustrating the polishing slurry feed and distribution means;

Fig. 4 is a perspective view of a second form of polishing apparatus employing a multiple array of small rotary runners;

Fig. 5 is a side-view of a twin runner row for the Fig. 4 apparatus;

Fig. 6 is a view of the runner face of one of the Fig. 4 runners;

Fig. 7 is an end view of a third form of polishing apparatus employing transverse twin belt runners;

Fig. 8 is a perspective view of a portion of one of the belt runner assemblies of Fig. 7.

Figure 9:
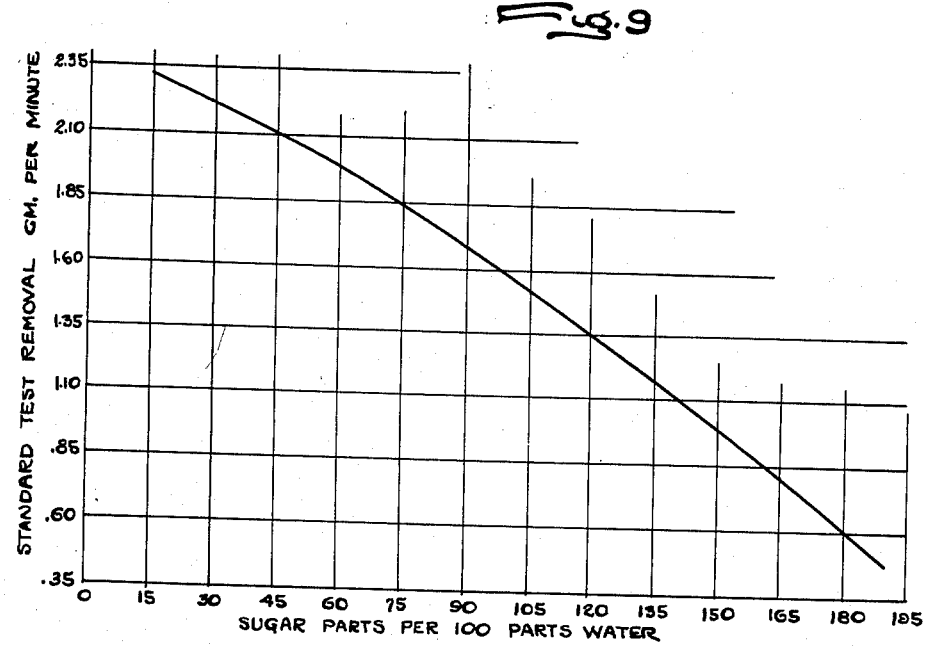
Fig. 9 is a curve illustrating the effect of varying the sugar content in a polishing slurry.

The process about to be described, the chemical compositions used in the process, and the exemplary apparatus means for performing the steps of the process are designed for high speed production of a high quality product meeting commercial standards of at least glazing quality and preferably with a substantial percentage of the daily tonnage of mirror or silvering quality. It will be apparent to those skilled in the glass-making art that many variations can and will be made to obtain optimum techniques for particular requirements while other variations are merely a matter of designer's choice. It will be appreciated that the intention is to cover and secure the invention in its fullest spirit and scope as set forth in the appended claims.

A. OVER-ALL PROCESS

In accordance with the invention, the ground surface of plate glass is subjected to concurrent chemical and mechanical action to economically expedite the polishing process.

Briefly, the process requires maintenance of a supply of a glass-attacking solution and a finely divided abrasive, chemically inert with respect to the solution, between the glass surface and a high velocity runner pad which conforms to the general plane of the glass surface. Since the runner faces found satisfactory are made of felt of the same type and characteristics having a long history in prior rouge polishing art, the pads are simply referred to herein as felts. The abrasive particles, of the same size range as conventional rouge abrasives, are suspended in the solution on the glass under the felt to form a slurry which removes glass many times faster than abrasive alone when under the felt but does not destroy the polish achieved when dwelling on glass surfaces beyond the runner.

The solution incorporates potassium and bifluoride values, the bifluoride being a member of that class of chemicals which has long been known to attack silicate glass and decompose it. The amounts are concentrated and effectively buffered to yield predictable and safe results. Whatever the exact mechanism may be, from the data available it seems reasonable to infer that the attack of the glass results in the instantaneous formation of a film of small, closely spaced and tightly adherent potassium silicofluoride crystals which render the glass substantially impervious to further attack. The high or plateau areas of the crystal film are sheared from the glass by abrasive action to renew the attack. It is this self-limiting attack, and its repeated selective renewal, to which the effective control is attributed.

In accordance with this theory, formulation of effective solution balances has been guided by the assumed smaller crystal size, apparently realized (1) directly with the concentration of the glass-reacting ionic species in solution, (2) inversely with the solubility of the reaction product, and (3) directly with the viscosity of the solution.

Particular formulations realizing the advantages of the invention and the further disclosure of the method employing them follow in succeeding sections.

B. EXAMPLES OF POLISHING SLURRIES FOR LARGE SCALE USE

The composition of the slurry employed may be varied within limits to accommodate the number and form of runners, their motion, the pressure or pressures, the speed of glass travel, and the quality of the end product expected. Accordingly, two examples of solutions suited for practice of the method with large-scale apparatus are described and compared.

Example 1

| Ingredient | Parts by Weight | Percent of Total |
|---|---|---|
| Water ($H_2O$) | 100 | 34.5 |
| Sugar (Sucrose) | 140 | 48.3 |
| Hydrofluoric Acid (HF-Anhydrous) | 5 | 1.72 |
| Potassium Bifluoride (KFHF) | 45 | 15.5 |

The solution becomes a slurry by addition of an inert finely divided abrasive which is suitably chromic oxide ($Cr_2O_3$) in the range of one to ten percent of the weight of the solution. The particles are finely divided, suitably with an average ultimate diameter of about 0.5 micron.

This solution, despite the large amounts of materials dissolved, has a saturation temperature of about 85° F. and thus may be stored at conveniently maintained temperatures, although usually fresh solution is formulated or used solution is replenished as the polishing operation proceeds so that long term storage is unnecessary. Agitation is required to keep the abrasive in suspension. Viscosity at a temperature of 100° F. is about 19 centipoises. Another significant measurement is the acidity, the pH value, as measured electrometrically, using a calomel and quinhydrone electrode, being approximately 2.25.

While the relative proportions of any of the solution ingredients affects the behavior of the polishing solution, the sugar is a conveniently adjustable control agent, greater amounts being used for closer quality control. It is not consumed in the chemical attack of the glass and its variation in amount does not appear to otherwise interact with the chemical activity of the $K^+$, $H^+$, and $F^-$ ionic species. To a large extent, therefore, the change of sugar content corresponds to a simple, mechanical control usable by factory production or quality control personnel in day to day operations.

Turning to the other ingredients whose glass-attacking propensities are already known, the identical solution may be formulated with other available ingredients whatever the solution equalibria or ionic species involved.

For example, in making an initial batch of solution, hydrofluoric acid of a conveniently available aqueous concentration is employed, its water content replacing part of the specified water of the solution. For large scale formulations, anhydrous HF may be desired. Potassium fluoride, instead of potassium bifluoride, may also be conveniently employed as a formulating ingredient, one mole of potassium fluoride and one mole of hydrofluoric acid constituting the equivalent in aqueous solution one mole of potassium bifluoride. Thus, for Example 1, the five parts of HF and 45 parts of KFHF may be replaced by 16.5 parts of HF and 33.5 parts of KF to obtain the same solution. As a matter of fact, upon cooling the solution sufficiently below its saturation temperature (86° F.) the precipitate formed appears to be potassium bifluoride. All indications are that the description of the glass reacting ingredients as potassium bifluoride plus added acid is direct and realistic.

Potassium carbonate ($K_2CO_3$) or potassium bicarbonate ($KHCO_3$) may also be employed as a starting ingredient for supplying the potassium values. Its mixture with hydrofluoric acid results in the formation of carbonic acid which is unstable, breaking up into water, which should be taken into account as such, and carbon dioxide gas, which escapes, leaving the potassium ion in solution. Potassium hydroxide (KOH) and hydrofluoric acid (HF) may also be employed.

Variations in the formulation are described in a subsequent section.

A useful index for comparing or contrasting the solution of Example 1 with variations is the hydrogen to fluorine (H/F) atomic ratio which in this case is about 0.59. In such a ratio H represents the number of acid or ionized hydrogen atoms (such active hydrogen atoms exclude those present in the substantially undissociated water and sugar molecules) relative to the number of fluorine atoms. This ratio is readily calculated from the molecular weights of HF and KFHF and the number of moles of each for a given amount of solution. Thus the H or F count is the number of solute moles containing such an atom times the number of such atoms per mole. The ratio is the same, of course, when calculated from the composition of Solution 1 as expressed in molecular equivalent amounts of HF and KF.

Significantly, the ratio is less than that of hydrofluoric acid (for which the H/F ratio from the formula HF is obviously 1.0) but greater than that for potassium bifluoride (for which the ratio is obviously 0.5 from the formula KFHF). The index could not be other than 1.0 or greater were not some cation other than H present, all of the cation in this case being K+.

A second solution formulation illustrating both a change of ranges and partial substitution of equivalent ingredients is as follows:

*Example 2*

| Ingredient | Parts by Weight | Percent of Total |
| --- | --- | --- |
| Water ($H_2O$) | 100 | 38.8 |
| Sugar (Sucrose) | 90 | 35.0 |
| Hydrochloric Acid (HCl-Anhydrous) | 9.4 | 3.66 |
| Potassium Bifluoride (KFHF) | 58 | 22.5 |

While this solution may be employed to carry in suspension the chromic oxide particles as specified in Solution 1, a mixture of particles in terms of percent of the solution weight may alternatively be employed, as for example:

|  | Percent |
| --- | --- |
| Chromic oxide ($Cr_2O_3$) | 2 |
| Barium sulphate ($BaSO_4$) | 2 |

The abrasive mixture is not illustrated as specific to Solution 2 but simply to further indicate the choice available. Both are chemically inert in the solution.

The viscosity, with the 4% of abrasives added, is 15 centipoises at 100° C. and the pH is measured as 1.7. The saturation temperature is somewhat below 80° F.

As in the case of Example 1, the solution of Example 2 is designed to permit variation of the amount of sugar, the 90 parts in this case reflecting a reasonably safe lower limit, and permitting a higher removal rate than that of Solution 1.

The H/F ratio of the solution of Example 2 is 0.67, the HCl contributing to the acid H+ proportions. The Cl− ion in the solution does not contribute to the F atomic count. The ratio remains as close as it does to that of the Example 1 solution, despite the added acid, because of the increased amount of potassium bifluoride in solution, each bifluoride molecule contributing two F atoms for each acid H atom it contains. The lower saturation temperature remains (as compared with Solution 1) since the added acid makes the potassium bifluoride more readily soluble.

C. LARGE SCALE PRACTICE OF THE METHOD

(1) PROCESS TECHNIQUES

In the practice of the invention for economic plate glass manufacture, a continuously moving glass line made up of either cut sheets of ground glass for upper side polishing or an uncut ribbon of glass for simultaneous polishing on both sides must be accommodated. Typical line speeds may be, for example, in the range of 100 to 200 inches per minute, and an exemplary width of the glass sheet or ribbon may be taken as in the vicinity of 127 inches.

In typical practice of the invention the glass ribbon moves under (or between) one or more runners stationed beyond the grinding line. The runners have a high velocity, many times the speed of the glass line, and are preferably rotary to conveniently provide high linear speeds. Linear speeds up to the vicinity of 20,000 inches per minute have been successfully employed. Felt faces on the runners are preferably backed with a resilient pad, such as sponge rubber, to help maintain near uniform pressure of the felt against the glass and minimize the effect of vibration and mechanical aberrations in the course of the runner and glass movement.

The slurry is introduced between the glass surface and the runner. To maintain the supply, a pressure or positive feed is preferred. Effective distribution is enhanced by directing the slurry to local areas through grooves or channels in the runner face. Slurry may also be applied to the glass surface ahead of the runner and thus be fed under the runner as the glass advances, but the decreased likelihood of even distribution, at least for under large runners, makes this method desirable chiefly as an auxiliary. Some circulation of the slurry is implicit in the requirement of maintaining a supply on the interface. Slurry is left on the glass departing from under the runner and additional slurry may be allowed to flow or be flung from under the moving runner. Maintaining a supply of slurry has not been successfully accomplished by confining or entrapping a given amount of slurry. The slurry is desirably only partially "used" since chemical depletion changes the slurry concentration with respect to water.

A balance of slurry flow, sometimes controllable in terms of feed pump pressure, with runner pressure and velocity, provides a substantial working of the glass. In the main, the runner pressure must not be so excessive as to prevent effective slurry distribution and cause areas of the felt to run dry. Neither should the pressure be so slight, relative to the amount of slurry in the interface, that the runner is flooded out and simply shears the fluid without doing work on the glass. Runner pressures in the range of one to five pounds per square inch of felt surface have been successfully employed with the slurry flow rate or feed pressure adjusted to load the runner drive. A wattmeter or other drive power measuring device serves as an indicator for this purpose. The viscosity of the slurries is substantial, a factor making it easy to simultaneously maintain a flow rate high enough to assure slurry distribution and runner pressures high enough to prevent flooding out.

The slurry may be recirculated as the operation proceeds, the "used" slurry left on the glass being collected and returned. The slurry supply is preferably replenished as it is used by adding the formulation ingredients needed to bring it up to the prescribed concentration. The reaction solids are suitably removed by centrifuging.

The rate of removal is essentially constant for a given solution under a runner. Each glass area must be washed long enough to proceed from its initial ground condition to a final polished surface. With a moving ribbon and a stationed runner, each glass area has a limited working time. Whether more than one runner stage is required is largely a matter of keeping within safe temperature differential limits (a 150° F. maximum glass temperature affords a rule of thumb safety limit) and reasonably equal distribution of polishing effort across the entire width of the glass sheet or ribbon. The glass must be rubbed and heat is unavoidably generated, as in rouge polishing, save that for a given required heat dissipation the polishing removal is vastly increased by reason of the interplay of abrasive and chemical actions. The flow of slurry essential to maintain a distributed supply in the glass-felt interface makes it possible to limit the temperature rise under substantial runner areas.

Whether the polishing is completed under one runner or in stages, it must be eventiaully interrupted without damaging the polished surface lying under the slurry and moving felt.

Mechanical termination is simple. The glass moves from under the runner felt without any starting or stopping which would surely deface the polished surface.

Chemical termination is another matter. Once washing is started, practically instantaneous dilution of the slurry to a harmless state is called for. If this is not done, the uncontrolled chemical attack during the time the solution passes through a dangerously dilute phase may be sufficient to undo the polishing action. The preferred technique is to first wipe the slurry from the glass (as by a rubber squeegee extending across it). The wiped area is then washed off with water, the thin film of solution on the wiped glass being easily and quickly diluted with moderate sprays. The thin film of solution remaining after wiping is not safely left on the glass since its composition can change rapidly toward a dangerous phase by chemical depletion or slight moistening.

While the polishing slurry does not noticeably affect polished glass when left on it for a few seconds or even a few minutes, the air-slurry-glass interedge around droplets soon shows as a ring. Such local effects are avoided by flooding the entire area of glass in the vicinity of a runner felt. This essentially static dwell of the solution prevents spotting by slurry escaping from under the runner, and reduces the likelihood of dangerous or local dilution by wash water splatter. The static-dwell slurry is removed from the glass along with the slurry trail from the runner after polishing.

A slight chemical haze or stain may remain which is best removed by abrasive action to brighten the glass. A stage or two of conventional rouge polishing may be employed. Such post-polishing is but a very small proportion of the usual rouge polishing effort required for total polishing and still preserves the economy and shortness of equipment line of the invention.

Day to day control of the process is realistically directed toward the production of the highest quality polish. In most cases the demand spectrum for sizes and grades is varied. The value of the daily output depends upon the visual effect to the trained eye of the number, kind, and distribution of the defects as they affect the size and grading of the saleable glass. Generally speaking, the glass removal must be adequate to overcome "short," i.e., too many remaining pits. The chemical and abrasive attacks must also be simultaneously controlled to prevent the addition of other surface defects during polishing.

(2) TYPICAL APPARATUS

The manner in which the relatively fast removal with mechanical working afforded by the chemical attack of the solution of Example 1 or 2 is reconciled with feasible apparatus for practicing the method of the invention is further seen by reference to exemplary types of full-scale apparatus.

Figures 1 to 3 illustrate generally a preferred first type of apparatus in which the upper and lower runners of a twin runner pair each present a large ring-shaped surface to the glass. As schematically indicated in Figure 1, a glass ribbon moves endwise over such a ring-shaped or annular rotary runner face 2 and under an aligned similar upper runner (not visible in Fig. 1). The inside diameter of the runner exceeds the glass width resulting in the two separate arcuate runner paths, oppositely curved, across the glass ribbon. A blocking plate 3 is stationed near each side edge and lower surfaces adjacent the overhanging portions of the upper and lower runners to help control the distribution of the polishing slurry.

Extending transversely across the glass ribbon 1 against the upper and lower surfaces are respective pairs of entrance and exit squeegees 4 and 5, suitably made of rubber, which wipe the glass entering and leaving the runner station. In the chamber defined between the squeegees the entire exposed glass area is sprayed with the polishing slurry. Wash water is readily applied as a spray from perforated water supply pipes 6 extending across the upper and lower surfaces of the glass beyond the exit squeegees 5.

As shown in Fig. 2, each lower runner assembly 2 is rotated by a motor 7 at speeds in the range indicated. The similar upper runner 8 has its own motor 9 for rotating the upper runner at a similar speed but in the opposite direction. The glass ribbon 1, shown in the end view of Fig. 2 is supported by the lower runner against the pressure exerted by the upper runner, suitably effected by screwdown adjustment of its vertical position. As further shown in the cross section view of Fig. 3, each runner 2 or 8 has a hollow drive spindle 10 through which slurry is supplied to the center of the runner. A rigid runner supporting plate 11 carries a sponge rubber backing 12 for a ring 13 of wool felt. Radial grooves 14 (Fig. 1) in the felt allow the slurry to flow from the inside to the outside of the ring, and also serve to feed the slurry under the advancing edges of the sequence of felt blocks defined between the radial grooves.

A catch basin or pan 15 (Fig. 2) under the runner collects the partially depleted slurry dripping off the edges of the glass for recycling or other economic recovery. With both sides of the glass being simultaneously polished, the chemical control problem of preventing uneven wetting and attack by seepage from an upper side to a previously polished lower side is entirely avoided.

Another apparatus arrangement is shown in Figures 4, 5 and 6 in which the glass surface passes under an array of small runners for single side polishing and upper and lower arrays for twin polishing. Shown in Figure 4, are three rows 16, 17 and 18 of four upper runners 19 and lower runners 20 which are patterned to work the entire glass width with some degree of uniformity and with each glass area having the benefit of a high degree of multi-directional working. The runners in lengthwise file along the glass ribbon are of different sizes so that their lowest work peripheral trails on the glass are not aligned. The runners in lengthwise file may also have their axes of rotation staggered along the line of travel of the glass.

Entrance and exit squeegees 21 and 21a define the slurry dwell area for each runner row. The glass is washed, suitably by spray pipes 22 following each exit squeegee. Cooling, as well as washing, of the glass between the polishing stages is thus provided.

Figure 5 illustrates a hollow-spindle center feed twin drive assembly for an upper and lower runner 19 and 20. The view is from the side of a runner row and shows the ends of upper and lower pairs of slides 24 and 25 which respectively support the upper and lower runner row carriages 26 and 27. By oscillating the carriages in the slides, the lateral movement combines with the endwise travel of the glass ribbon to further distribute the working of the glass by the rotary runners. Upper and lower drive motors 28 and 29 for each row are coupled to the respective spindles of each row to drive adjoining runners at rotary speeds providing equal peripheral velocities in the same direction for the runners of equal diameter.

As shown further in Fig. 6, the felt face 30 of each center-feed runner is grooved for distribution of the slurry in the glass-felt interface. The number of rows of runners can be varied, of course. If desired, different rows can be operated under different runner speeds, pressures or slurry feed rates for even more varied control. The slurry may also be varied from row to row; for example, the first two rows may employ the slurry of Example 2 with 90 parts of sugar per 100 parts of water while the last or finishing stage may employ the same slurry but with the practical maximum of 190 to 200 parts of sugar per 100 parts of water for maximum dilution insurance.

Still another type of apparatus employing a strictly transverse motion of the felt is provided by the belt polisher of Figs. 7 and 8. There are shown the grooved felts 31 on the outer surface of an endless belt 32, one run or span of which bearing against each of the surfaces of the glass, a twin assembly being shown.

Each belt becomes an effective runner with the assistance of a flat pressure shoe 33 spanning the glass ribbon and adjustably bearing against the glass through the polishing belt span. In this example, an inner belt 34, one span of which engages the length of the polishing belt working the glass has an anti-friction surface in engagement with the runner shoe.

Again, the felts are grooved to help carry to the glass surface a slurry supply sprayed on upper and lower belts from a supply pipe 35. If more than one belt station is employed, the belts of the different stations may, if desired, be positioned at different oblique angles across the ribbon. For a further description of the belt polishing type of apparatus reference is made to the application of David C. Rich, James E. Archer, and George R. Harrison, Serial No. 699,281, filed November 27, 1957, and assigned to the assignee of the present invention.

D. EQUIVALENTS AND LIMITATIONS REVIEWED

Attention will next be given to the range of equivalents which has been ascertained for the slurry compositions previously set forth. As foreshadowed there, it is indeed possible to substitute equivalent proportions or amounts of individual constituents. It is possible to substitute equivalent constituents. And in both instances it is possible by such substitutions to obtain substantially the same composition, functioning in substantially the same way to produce the same results. The possibilities of variation in composition to accommodate altered conditions, techniques, and objectives, and in any event still remaining within the contemplation of the present invention, are accordingly described. In some cases a fair latitude exists, in others very little.

(1) TEST PROCEDURES

While the ultimate test for the successful removal of glass, as required in a polishing operation, is the success of the plate glass line itself, the numerous operating conditions to be accommodated and varied, as well as the difficulty and expense of full scale testing for quality control or design variations, makes it desirable for the plate glass manufacturer to resort to small scale test procedures. The removal rates with different slurries are particularly difficult to measure with large scale apparatus. Certain apparatus and procedures have been evolved and correlated with larger scale polishing through a great deal of experimental and testing work. The benefit of these procedures found useful is here disclosed in terms of standardized test procedure.

Test samples used have been 14" squares of a nominal ¼" thickness glass plate produced in a conventional grinding line. One side is polished so that the effects of the test polishing of the other ground side can be more readily observed. The glass analysis is typical of plate glass manufacture, the silica ($SiO_2$), soda ash ($Na_2O$), and lime (CaO and MgO) constituting substantially 99% of the glass substantially in the respective ratios of 5.4 to 1.0 to 1.13 parts by weight. In the lime constituent, the magnesium oxide (MgO) may be considered as replacing part of the calcium oxide (CaO).

The quality of the smooth is that commonly associated with a grinding process terminating with garnet particles having a 15 to 20 micron maximum diameter specification. Its precise definition is difficult to assay. The usual short-hand definition is in terms of critical pit or fissure depth. This depth, for the smooth grind referred to herein, is in the range of 400 to 600 micro inches, being the equivalent solid layer for weight removed per given area in rouge polishing ground glass samples.

In a standard test machine providing a reference for small scale testing, the glass plate is centered, ground side up, on a turntable which rotates at 200 revolutions per minute. A free-turning 10 inch diameter runner rests on the glass sample at a static pressure of 1.3 pounds. The runner spindle is offset 4⅜ inches from the axis of rotation of the turntable and laterally reciprocates at 35 times per minute in one-inch amplitude oscillations. The runner has mounted on it a sponge rubber pad ½ inch thick, faced by a ¼ inch thick white wool felt. Side feed of the slurry at a rate of about 125 cubic centimeters per minute kept the worked glass area wet.

By weighing the glass plate before and after testing, the removal rate is calculated. A two minute test is usually sufficient, provided the runner felt has been broken in by running on another plate with the test solution. With the slurry of Example 1, the rate is about 1.1 grams per minute; with the slurry of Example 2, the removal is 1.8 grams per minute. This dropped down to about 1.3 grams per minute when 140 parts of sugar per hundred parts of water (the same as in Example 1) were used and to about 0.6 gram per minute with 190 parts of sugar per 100 parts of water.

The test plates are also carefully evaluated for quality of the polish. The examination has been conducted by what may be termed the (1) direct visual low-angle tests, (2) edgelight test, and (3) pinpoint projection test in an attempt to detect and classify the surface defects affecting grading of the glass. In the tests with the Examples 1 and 2, there were no defects preventing top grading of the glass.

(2) SUBSTITUTE ABRASIVES

Only chemically inert abrasives are desired. Rouge ($Fe_2O_3$), when employed in solutions of the type discussed, tends to flocculate, sometimes forming one solid chunk. Chemical analysis has also shown formation of an iron fluoride with a substantial undesired depletion of the fluoride content of the solution.

Some of the abrasives in addition to the chromium oxide and barium sulfate previously mentioned which have been satisfactorily tested are calcium fluoride ($CaF_2$), magnesium fluoride ($MgF_2$) and tin oxide ($SnO_2$). The amount of abrasive suspended in the slurry has been varied from one to ten percent without a substantial fall off in the polishing rate. As a rule, the removal of the glass increases slightly with the increase of abrasive employed within this range. The effect is very small, however, compared with the much more significant variation and control of removal by the changes in the solution formulation.

The variation in the amount of abrasive by no means indicates that the method can be successfully practiced without the abrasive. It should be kept in mind that immediate variations due to change of abrasive amounts are difficult to detect or sensibly measure. For example, in use, the slurry impregnates the felt face of the runners with sufficient particles of abrasive to continue removal for at least a few minutes of polishing employing a clear solution. Addition of abrasive as the polishing proceeds is required, the process being an essentially and necessarily wet one as contrasted with conventional last-stage rouge runners in which the substantially dry rouge builds up on the felt face.

While the size of the abrasive particles or uniformity of their sizes does not appear to be particularly critical, it will be appreciated, of course, that the maximum size is very much smaller than the sand or garnet particles in grinding. The average particle size here mentioned is one half micron and is comparable to that for rouge particles.

Using one of the exemplary solutions without any abrasive, the glass removal is very low without assurance of ever reaching a polish. Using abrasive and water without the glass-attacking chemicals of the solutions, the glass removal at usual test times on the standard test machine is practically nil.

(3) SUGAR AS A DILUTION BUFFER

Substantial amounts of sugar are required for control of the attack of the glass-reacting materials, which must themselves be present in concentrated amounts to set the conditions for useful reaction. Regarding the sugar as a buffer against dilution, it is revealing to first view the relatively narrow effective concentrations in the perspective of the tremendous range of dangerous dilution of the overall polishing solution.

Such an overall dilution may be encountered when washing the slurry from the glass or upon local chemical depletion. It may be simply observed by dipping a polished glass sample into the solution of Example 1 for 30 seconds, washing the solution off, and inspecting the glass, which shows no impairment of the polished surface and only a minute weight loss due to glass removal. Upon diluting the solution, as set forth in Table I, the safe concentration becomes a dangerously dilute one which continues to harm a polished surface until very dilute and hardly much more than contaminated wash water.

TABLE I

*Static dwell of diluted solution Example 1*

| | Parts by Weight | | | | Percent $H_2O$ | Quality |
|---|---|---|---|---|---|---|
| | $H_2O$ | HF | KFHF | Sugar | | |
| (1) | 100 | 5 | 45 | 140 | 34.8 | Unaffected. |
| (2) | 390 | 5 | 45 | 140 | 67 | Slight Stain. |
| (3) | 680 | 5 | 45 | 140 | 78 | Heavily Stained. |
| (4) | 2,420 | 5 | 45 | 140 | 93 | Do. |
| (5) | 3,000 | 5 | 45 | 140 | 94 | Less Stain. |
| (6) | 3,290 | 5 | 45 | 140 | 95 | Slight Stain. |
| (7) | 3,725 | 5 | 45 | 140 | 98 | Unaffected. |

Removal with the standard polishing test machine show that the removal rate of Examples 1 and 2 rises as the water is increased with a maximum removal somewherein the vicinity of 50% or more water in the total weight. This removal falls off as the solution is further diluted. The removal apparently varies somewhat erratically during the initial dilution, while in any but the most concentrated ranges. The glass surface during the high removal rates obtained with dilute solutions is heavily stained, and further dilution to the point of providing the removal rates again in the vicinity of Example 1 or Example 2 does not yield polished glass.

The striking effect of the sugar when it alone is varied is illustrated in the curve of Fig. 9 in which glass removal increases as the sugar of Example 1 is reduced to zero. The quality degenerates, however, and in the vicinity of 90 parts or less of sugar per 100 parts of water the solution becomes unsafe. An unsatisfactory polish is then obtained, the crystals apparently being too large and too easily dislodged to provide the controlled attack necessary for planing of the glass. Reduction of the sugar of Example 2 has the same effect. Microscope studies of the etch pattern on polished glass surfaces caused by dipping polishing glass in similar solutions show that a frost-like pattern appears in which the etched images of crystals increase in size as the sugar is decreased.

No exact point exists for which a solution becomes generally unsafe for polishing under a runner. The important consideration is that with substantial amounts of sugar (the minimum of 90 parts or more per 100 parts of water has been found a good rule of thumb measure) the probability of obtaining a higher dollar yield from the glass output is improved. Considering 140 parts of sugar per 100 parts of water as midrange for the polishing conditions described, the desirability of using up to 190 or 200 parts of sugar per 100 parts of water must be weighed against the loss of removal rate.

While sugar may be regarded as a thickening agent or its aqueous solution in effective substantial amounts as a viscous liquid or syrup, the theoretical resolution of the viscosity effectiveness may be due to its different aspects. Thus mechanical viscosity may be helpful in loading the runner with desired slurry amounts, or an ionic viscosity, in which large sugar molecules block movements of ions which tend to reduce nucleation of crystals already nucleated, may be of assistance. Whatever the significance of one or the other kind of viscosity, commercially available sucrose ($C_{12}H_{22}O_{11}$) has the desirable properties of being compatible with the active chemicals in solution without apparent interference with their solubility, equilibria, or reactions.

A slight pH change, probably due to inversion of the sucrose, occurs after it has been dissolved in water but this has not been found of consequence.

Few substitutes meeting these requirements have been found and none are presently as easily available and inexpensive as sugar. One product, sorbitol, which is electrolytically derived from a sucrose solution, has performed as a substitute for sucrose on a substantially weight for weight basis and may be considered as embraced within the term "sugar," as would also molasses. Common thickeners such as starch appear to be affected by the high acidity involved. Glycerin, while helpful in the same manner as sugar, affects the solubility of other ingredients too much to be a generally desirable substitute. Accordingly, the buffer ingredient having the characteristics described for sucrose has been referred to as sugar and in aqueous viscous solutions the material may be termed a syrup.

(4) RELATIONSHIP OF POTASSIUM BIFLUORIDE (KFHF OR $KHF_2$) AND ADDED ACID

Potassium bifluoride (KFHF or $KHF_2$) is required in a heavily concentrated solution—usually in an amount equal or close to saturation at practical slurry temperatures. Assurance of dissolving adequate amounts of potassium bifluoride in water at normal room or plant temperatures for successful polishing under usual conditions requires that acid be added to the water. And even with the concentrated acidic solution of potassium bifluoride, sugar must be retained to provide control.

It will be appreciated that since the formula KFHF indicates that a solution of bifluoride is already a mixture of an acid and a fluoride, the amount of additional acid poses some problems in exact definition. It is postulated that the added acid directs the solution equilibria toward the maintenance of the bifluoride ion, $HF_2^-$, thus effecting, within the solution itself, more effective concentration of KFHF.

Figure 10:
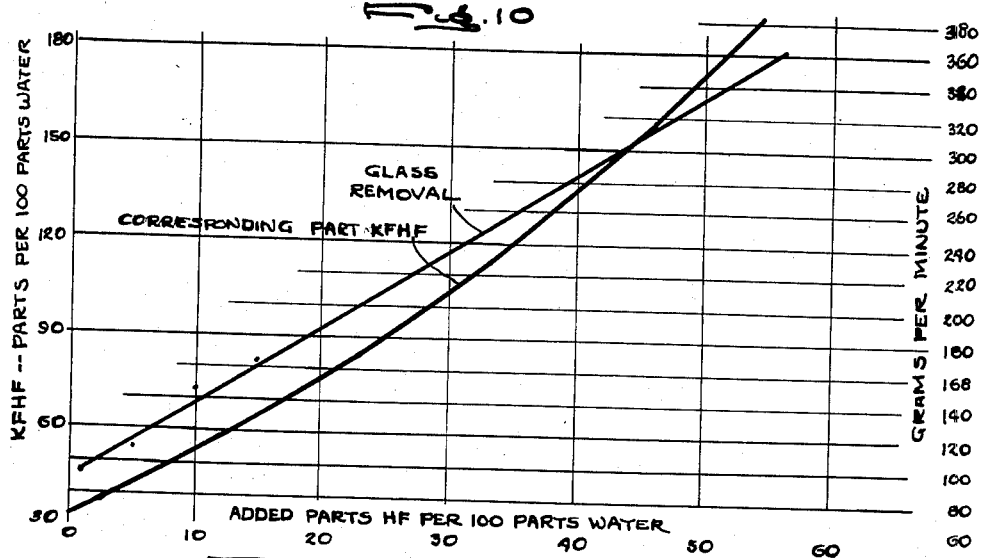
Fig. 10 is a set of curves illustrating solubility of potassium bifluoride and resulting polishing removal rate as the acid of a polishing slurry is varied.

The added acid HF (corresponding to that of Solution 1) may be greatly increased, provided the potassium bifluoride is increased, approximately in the amount required for saturation. Fig. 10 illustrates just such a family of solutions in which, for 100 parts of water and 140 parts of sugar, the parts of hydrofluoric acid are varied. With them, at saturation temperatures in the vicinity of 70° to 80° F., the parts of potassium bifluoride are also varied.

As shown in Fig. 10 the removal rate increases with the increased concentration of HF and KFHF. Apart from the tests conducted with zero or one part of added acid, the glass quality was good in each case. Corresponding results are obtained with similar variations of the solution of Example 2 by varying the HCl and dissolving more or less KFHF accordingly.

Figure 11:
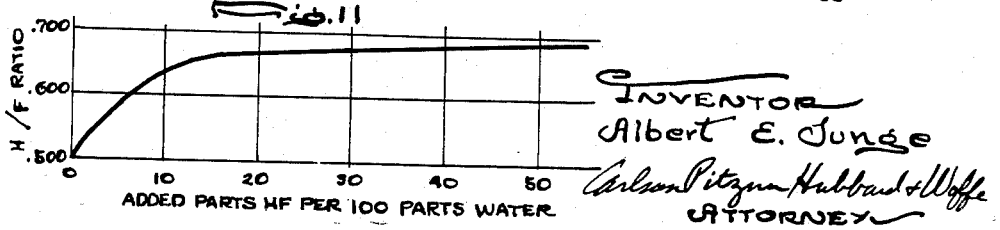
Fig. 11 illustrates the maintenance of the H/F ratio in the slurries of Fig. 10.

Referring to Fig. 11, the H/F ratios for the different amounts of KFHF and HF in the tests of Fig. 10 are shown and despite the differences in amounts of chemicals, the ratio for the successful solutions remained in a narrow range (approximately 0.55 to 0.69 in this case).

On the other hand if, in the solutions of Example 1 or 2, the added acid is increased without increasing the potassium bifluoride, the resulting increase in removal rate is accompanied by serious polishing defects. The H/F ratio also increases. Increasing the potassium bifluoride of either solution without increasing the added acid is quickly limited by insolubility. Decreasing the potassium bifluoride without decreasing the acid increases the removal rate but injures the quality. Again the H/F ratio is increased. In such tests it is noted that in the immediate vicinity of no or little added acid, the saturation temperature or other conditions appear to be either very critical or erratic.

The relative amounts of the total dissolved acid hydrogen and total dissolved fluoride with respect to each other have, indeed, been found to be a useful guide to classifying the glass-attacking solutions encompassed in the scope of this invention and to predicting the range in which useful solutions can be formulated. Referring again to the basis for the H/F ratio calculation, by "total dissolved acid hydrogen" in this case is meant the sum of all the acid hydrogen atoms, whether present in the solution as $H^+$, $HF_2^-$, undissociated HF, or a complex combination of hydrogen and fluorine atoms. These atoms are obtained from potassium bifluoride or polybifluoride and added acid; the hydrogen atoms introduced with the water and sugar are not included. By "total dissolved fluoride" is meant the sum of all dissolved fluorine atoms, obtained from KF, $KHF_2$ or other soluble fluoride salt, and added HF, in whatever ionic or molecular species they are present in the solution.

Although the molar H/F ratio thus calculable has not been proven to have a direct mathematical relation with the complex equilibria in the concentrated solutions of this disclosure, it apparently does reflect profound differences in the action of these solutions on plate glass, in particular in the course of polishing plate glass. Thus, the operable solutions, capable of producing a good polish under the specified conditions, have a definite optimum molar H/F range of from somewhat in excess of 0.50 to 0.75, whether ratios above 0.50 are obtained with added $H_2SO_4$, $HNO_3$, HCl, HBr, or HF itself. With acids such as $H_3PO_4$, which in solution results in the weak acids $H_2PO_4^-$ and $HPO_4^=$, or with other acids weakly dissociated in water, the operable H/F ratio if calculated to include all of the H of the weak acid extends to a higher range, apparently corresponding to the failure of part of the hydrogen to dissociated from the acid molecule and play an active part in relation to the glass attack.

The solutions of Examples 1 and 2 illustrate compositions in the indicated optimum range, i.e., 0.59 for Example 1 and 0.67 for Example 2. These solutions were formulated, respectively, with added hydrofluoric and hydrochloric acids.

Under special conditions of polishing illustrated by specially designed runners and extremely high flow rates and a very delicate balance of applied pressure and solution pressure, a polish satisfactory for many purposes can be achieved by only limited departures outside this optimum range. Solutions above 0.75 can be prepared with excess acid, while ones of 0.50 can be prepared with KFHF or below 0.50 can be prepared with appropriate mixtures of KF and KFHF. However, there is no advantage in proceeding in these directions, and thus unnecessarily limiting the tolerable devications from mechanical perfection of equipment or reducing the safety factor in continuous factory operation. In no case has a molar H/F ratio approaching or exceeding 1.0 with a strong added acid been found to give an acceptable finish in polishing plate glass. Such solutions can be illustrated by HF alone (H/F=1.0), or HF and an added acid (H/F greater than 1.0), or they can be illustrated by KFHF and sufficient added strong acid to make the ratio equal to or greater than 1.0. All are equally inoperable in the present process. As noted previously, in the case of very weakly dissociated acids, larger amounts are required to be equivalent to the strong acids.

(5) POTASSIUM AS A NECESSARY CATION

No substitute for the presence of the potassium ion ($K^+$) in the polishing slurry has been found. Further, from many tests it appears that the potassium ion is desirably in the proportions supplied by potassium bifluoride with whatever added acid brings the solution within the H/F ratio range. Only the ammonium bifluoride ($NH_4FHF$) in water solution with or without added acid is able to provide such a concentrated bifluoride solution. However, it has not been a successful substitute for KFHF, despite the achievement of the desired H/F ratio. The glass quality is poor, the glass tending toward a frosted surface on standard polishing machine and larger scale tests and having severe haze and directional defects as well as much higher glass removal rates. From the film theory, it appears that the much greater solubility of $(NH_4)_2SiF_6$ than of $K_2SiF_6$ in the slurry causes larger crystal sizes and less self-limiting effect. Attempts to replace only part of the potassium with ammonium in otherwise operable solutions has led to deterioration in glass quality. The bifluoride of silver, while quite soluble, also does not perform satisfactorily in polishing slurries, presumably due to the solubility of its silicofluoride.

Neither has sodium ($Na^+$), as a replacement cation, been successful. While its silicofluoride is relatively insoluble, so is its bifluoride. Other sodium salts, when used in attempted formulations of solutions also containing hydrogen and fluorine atoms, have caused precipitation of sodium bifluoride. The polish quality is poor with the dilute solutions involved.

What I claim is:

1. The method of polishing plate glass by rubbing it with finely divided abrasive under a felt runner, which is characterized by introducing the abrasive under the runner as a suspension in a solution containing substantial amounts of potassium, acid hydrogen and fluorine ions which chemically attacks the glass, said abrasive being essentially inert to the constituents of said solution and essentially free of iron oxide.

2. A process for rapidly finishing ground plate glass to a high quality polish which comprises conveying a ground silicate glass ribbon between twin rotary runners having resilient pads urged against the glass surfaces, supplying to the glass surfaces at the runners a finely divided abrasive suspended in an acidic syrup substantially saturated with potassium bifluoride to work the glass surfaces between the runners, wiping the glass surfaces as the ribbon is conveyed from each twin runner, cooling the wiped glass with water, and repeating the process until the glass is polished.

3. A process for rapidly finishing ground plate glass to a high quality polish which comprises conveying a ground silicate glass ribbon under a succession of spaced rotary runners having resilient pads urged against the glass, flooding the glass surface under the runner with a finely divided abrasive suspended in an acidic syrup substantially saturated with potassium bifluoride, wiping the glass surface as the ribbon is conveyed from each runner, cooling the wiped glass with water, and repeating the process until the glass is polished.

4. A process for simultaneously polishing both ground surfaces of a plate glass ribbon which comprises the sequence of steps of passing the glass under a series of spaced runners having resilient pads urged against the glass surfaces, continuously supplying a slurry comprising an aqueous acidic concentrated potassium bifluoride and sugar solution having a finely divided inert abrasive suspended therein to the glass surfaces worked under the runner pads, providing a supplementary supply of slurry on the adjacent unworked glass surfaces not under the runners, wiping the slurry from the glass areas emerging from under each runner, and flushing the wiped glass with water to cool it.

5. A plate glass polishing slurry for use under a felt runner which comprises, an acidified aqueous syrup substantially saturated with potassium bifluoride and having a finely divided abrasive suspended therein.

6. A plate glass polishing slurry comprising, a finely divided abrasive suspended in an aqueous syrup having in solution therein an acid plus concentrated potassium bifluoride.

7. A plate glass polishing slurry for use under a runner comprising a finely divided abrasive suspended in an aqueous sugar syrup, having hydrofluoric acid plus a concentrated amount of potassium bifluoride dissolved therein.

8. A plate glass polishing slurry for use under a runner consisting essentially, for every 100 parts of water, of substantial parts of KFHF, enough parts of acid selected from the group consisting of HF, HCl, HBr, $HNO_3$, $H_2SO_4$, and $H_3PO_4$ to keep the KFHF in solution, and 90 to 190 parts of sugar, and having suspended therein finely divided particles taken from the group consisting of $Cr_2O_3$, $SnO_2$, $BaSO_4$, $CaF_2$, and $MgF_2$ in an amount from one to ten percent of the solution weight.

9. A plate glass polishing slurry for use under a runner felt which comprises a solution of acidified water having substantial amounts of potassium bifluoride and sugar dissolved therein, the stoichiometric proportions of the acid hydrogen to fluorine of the solution being in a range from 0.50 to 0.75, together with finely divided abrasive particles suspended therein.

10. The method of polishing plate glass which comprises rubbing the glass with a high velocity felt pad while supplying between the pad and the glass an aqueous syrup containing a finely divided abrasive, and amounts of dissolved acid hydrogen, fluorine, and potassium which are sufficient to afford substantial concentration in said syrup of potassium bifluoride at about room temperature, the ratio of dissolved acid hydrogen to dissolved fluorine atoms in said syrup being maintained below about 0.75.

11. The method of claim 10 wherein the amount of dissolved acid hydrogen, fluorine and potassium in said syrup are substantially equal to that afforded by saturation of the syrup with potassium bifluoride at room temperature.

12. The method of claim 11 wherein the amount of dissolved acid hydrogen, fluorine and potassium required to afford substantial saturation of the syrup with potassium bifluoride at room temperature is increased by the addition of an acid to said syrup.

13. The method of claim 10 wherein at least a portion of the dissolved potassium and fluorine atoms in said syrup are derived from potassium fluoride and the dissolved acid hydrogen therein is derived at least in part from an acid.

14. A step in the formation of plate glass as a part of a continuous process which consists of rubbing the surface with a felt flooded with an aqueous solution comprising for every 100 parts of water a sufficient amount of dissolved potassium bifluoride to afford a concentrated solution thereof and a quantity of added acid selected from the group consisting of HF, $H_3PO_4$, HCl, $HNO_3$, $H_2SO_4$, and HBr, and from about 90 to about 190 parts of sugar and said solution having suspended therein finely divided particles of a material selected from the group consisting of $Cr_2O_3$, $SnO_2$, $BaSO_4$, $CaF_2$, and $MgF_2$, in an amount of from about 1 to about 10 percent by weight of the solution.

15. A plate glass polishing slurry for use under a runner which slurry consists essentially, for every 100 parts of water, of an amount of dissolved potassium bifluoride sufficient to afford a concentrated solution thereof and a quantity of added acid selected from the group consisting of HF, HCl, $HNO_3$, $H_2SO_4$, $H_3PO_4$ and HBr, sufficient to assure the mtaintenance of the potassium bifluoride in solution and from about 90 to about 190 parts of sugar and said slurry having suspended therein finely divided particles of material selected from the group consisting of $Cr_2O_3$, $SnO_2$, $BaSO_4$, $CaF_2$, $MgF_2$, in an amount from about 1 to about 10 percent by weight of the slurry.

References Cited in the file of this patent

UNITED STATES PATENTS

| | | |
|---|---|---|
| 2,354,091 | Sharpe et al. | July 18, 1944 |
| 2,366,825 | Adams | Jan. 9, 1945 |
| 2,390,404 | Walker | Dec. 4, 1945 |
| 2,646,655 | Laverdisse | July 28, 1953 |
| 2,673,423 | Hoyet | Mar. 30, 1954 |